United States Patent [19]

Choi

[11] Patent Number: 5,173,772

[45] Date of Patent: Dec. 22, 1992

[54] METHOD FOR DETECTING MOTION VECTOR

[75] Inventor: Keon-Young Choi, Seoul, Rep. of Korea

[73] Assignee: Samsung Electronics Co., Ltd., Suwon, Rep. of Korea

[21] Appl. No.: 814,616

[22] Filed: Dec. 30, 1991

[30] Foreign Application Priority Data

Dec. 14, 1991 [KR] Rep. of Korea .............. 1991-23005

[51] Int. Cl.⁵ ............................................. H04N 5/14
[52] U.S. Cl. .................................... 358/105; 358/136
[58] Field of Search ............................ 358/105, 136

[56] References Cited

U.S. PATENT DOCUMENTS 4,951,140  8/1990  Ueno ................................. 358/105
5,021,879  6/1991  Vogel ................................ 358/105

Primary Examiner—Howard W. Britton
Attorney, Agent, or Firm—Robert E. Bushnell

[57] ABSTRACT

A real time motion vector detection method for increasing a speed of motion detection by using a digital signal processor in an image processing system. It is possible to reduce an operation time by making most use of a feature of DSP chip in performing a motion detection with the three step detection method, i.e., a so-called coarse-fine search method to search roughly in a first step and search accurately in second and third steps on the assumption of the distortion measure between each block being smooth in a search area.

3 Claims, 7 Drawing Sheets

|   | 4 | 4 | 8 | 4 | 4 |
|---|---|---|---|---|---|
| 4 | S1 | S2 | S3 | S4 | S5 |
| 4 | S6 | S7 | S8 | S9 | S10 |
| 8 | S11 | S12 | S13 | S14 | S15 |
| 4 | S16 | S17 | S18 | S19 | S20 |
| 4 | S21 | S22 | S23 | S24 | S25 |

*FIG. 6*

|   | 2 | 2 | 12 | 2 | 2 |
|---|---|---|---|---|---|
| 2 | S1 | S2 | S3 | S4 | S5 |
| 2 | S6 | S7 | S8 | S9 | S10 |
| 12 | S11 | S12 | S13 | S14 | S15 |
| 2 | S16 | S17 | S18 | S19 | S20 |
| 2 | S21 | S22 | S23 | S24 | S25 |

*FIG. 7*

METHOD FOR DETECTING MOTION VECTOR

FIELD OF THE INVENTION

This invention relates generally to a motion compensation method in a moving picture processing system such as video phone, video conference system and high-definition television set, and more particularly to a method for detecting motion vector wherein the speed of a threestep search in a block matching algorithm (hereinafter called BMA) increases.

TECHNICAL BACKGROUND OF THE INVENTION

Generally, there are disclosed various kinds of moving image processing systems such as a video conference system and a video phone. In the video phone, an image includes a space of; stationary picture such as a background image and additionally, the face and the bust of a human are the main objects to be expressed. Therefore, a correlation between the two continuous frames is very high because occurs a minor change; between the picture frames.

Utilizing such a feature of the images to be processed in the video phone, an interframe differential pulse code modulation (hereinafter called DPCM) has been proposed to reduce a redundancy in temporal direction. In order to increase a prediction efficiency of the interframe DPCM, there is disclosed a motion compensated interframe DPCM which can predict a change according to a motion of an object. Furthermore, of the various motion compensated interframe DPCMs, the BMA which detects a motion in a unit block is widely used.

A composite coding method combining the interframe DPCM with a discrete cosine transform (hereinafter called DCT) method detects a difference between a current image frame block to be encoded and a preceding image frame block by the DCT method. The composite coding method has a configuration as illustrated in FIG. 1.

With reference to FIG. 1, a format division 11 divides an input image of a unit frame into a number of blocks of a given size to thereby perform a formatting of the input image. A subtractor 21 receives the image blocks in sequence so as to detect a difference between the preceding and current frame information. A first data compressor 12 compresses output data of the subtractor 21 by the DCT method first. A second data compressor 13 quantizes the output of the first data compressor 12 thereby to further compress the output of the subtractor 21. A third data compressor 14 performs a variable length coding with respect to the quantized data by utilizing a statistical feature of quantized data.

In the meantime, a data expander 17 expands the output image signal of the second data compressor 13 by performing an inverse DCT. A frame memory 19 restores preceding frame information to store it thereto and generates motion compensated block data by a given control. A loop filter 18 filters the motion compensated block data.

An adder 22 adds the filtered motion compensated block data from the filter 18 to the expanded image signal from the data expander 17, so as to restore the preceding frame and store it in the frame memory 19. In this case, the frame memory 19 receives position information S2 from a motion detector 20. The position information S2 is a motion vector indicating a relative position of a block in the preceding frame which is similar to a block in the current frame, as shown in FIG. 3.

A multiplexer 15 transmits the quantization information S1 from the second data compressor 13 and the position information S2 from the motion detector 20 according to a format related to a transmission and receiving ends. A buffer 16 transmits an output result of the multiplexer 15 to the receiving end and generates a control signal CC for regulating a degree of data compression to the second data compressor 13 so as to be suitable for its input/output speed.

Receiving a difference signal and a motion vector during storing of the preceding frame information, the receiving end restores a current block by substituting a moving portion of the preceding frame information for a difference signal and a motion vector, and accordingly a continuous moving image may be expressed.

Based on the composite coding method, the BMA method and a distortion measure will be described hereinafter. The BMA represents a step for detecting a block of preceding image frames being most similar to a block to be coded in a current image frame. That is to say, this step is to compare a block of current image frames to be coded with a block of respective search position in a predicted search area of a preceding image frame, thereby to detect the most similar block.

In the composite encoder, the function of the BMA module is to detect a correct motion vector, and so a three-step search mode is widely used as a method for embodying a hardware easily and reducing a computational complexity for a real time system.

As illustrated in FIG. 4, the three-step search includes three steps and it is a kind of coarse-fine search to search roughly in a first step and search accurately in second and third steps on the assumption of the distortion measure between each block being smooth in a search area.

For computing the distortion measure, there are four functions such as NCCF (Normalized Cross-Correlation Function), MSE (Mean Square Error), MAE (Mean of the Absolute Error) and MNAE (Mean Number of bits necessary to binary code the Absolute Error). Among the four functions, the MSE is widely used because of its simple computation method.

$$MSE(i,j) = \frac{1}{M \cdot N} \sum_{m=1}^{M} \sum_{n=1}^{N} [I(m,n,t) - I(m + i, n + j, t - \tau)]^2 \quad (1)$$

where, M and N indicate size of the blocks, and $I(m+i, n+j, t-\tau)$ indicates an intensity of brightness of a $(m,n)$th image element of preceding image block being at a distance of $(i,j)$ from a current block to be encoded.

It takes a predetermined time as described below to compute a distortion measure by using a digital signal processor (hereinafter called as DSP).

For computing equation (1), a difference between m and n-th pixels firstly stored and a difference between the corresponding respective MxN blocks is squared to each other and then accumulated by a SQRA instruction. The SQRA instruction is a general instruction for accumulating after squaring a value, wherein the squaring and accumulating are done in one cycle of the instruction. Further, the number of instruction cycles which is necessary may be expressed as follows.

$$M \times N \times 25 \times 4 = 100MN(cycles) \quad (2)$$

where, the number 25 is a quantity of pixels to be searched as shown in FIG. 4 (in this case, 9 elements indicated as "○" in the first step and 8 elements indicated as each of "x" and "◊" in the second and third steps), and the number 4 is a number of cycles required for one operation.

The result of Equation (2) means that 2 cycles per pixel is required for storing the difference and one cycle for performing the instruction of SQRA. For example, in computing the distortion measure of a 16×16 sized block by using a DSP chip of TMS 320C25 by the Texas Instruments Company, a processing time can be expressed as;

$$16 \times 16 \times 25 \times 4 \times 100(nsec/cycle) = 2.560 \mu sec \quad (3)$$

According to the international telegraph and telephone consultative committee regulation H.261 for the video phone, it is recommendable that an input image have a size of ¼ CIF and a spatial resolution be as shown in Table 1 in case of processing ten frames per second, and a macro block include a 16×16 luminance component Y and 8×8 color difference signals R-Y, B-Y. Accordingly, a pixel clock and one macro block duration for which one macro block consisting of 16×24 pixels should be processed can be expressed as equations (4) and (5).

TABLE 1

| Image Format | Horizontal Resolution (pixels/line) | | Vertical Resolution (lines/frame) | |
|---|---|---|---|---|
| | Luminance Signal | Color Diff. Signal | Luminance Signal | Color Diff. Signal |
| 1 CIF | 352 | 176 | 288 | 144 |
| ¼ CIF | 176 | 88 | 144 | 72 |

$$F_p = (176 \times 144 + 88 \times 72) \text{ (pixels/frame)} \times 10 \text{ (frames/sec)} \quad (4)$$
$$= 380.16[\text{Kpixels/sec}]$$
$$T_B = 384/F_p = 1010.1 \text{ (}\mu\text{sec)} \quad (5)$$

Accordingly, input data to be processed is received by 380.16Kpixels/sec and an allocated time for processing the macro block including 384 pixels is limited to 1010.1μsec. Therefore, it is noted that at least more than three DSP modules are necessary to implement the video phone in a real time, so as to search distortion measure information of one macro block within a time of processing one macro block. Because the motion detection speed decides how many DSP elements are required, the motion detection speed is very considerable for embodying a motion detector when it is considering an economical point of view as well as a simplicity of hardware configuration by reducing a hardware size.

Presently, there is known a real time motion detector using two DSP chips, TMS 320C25, by reducing a processing time and by further using the three-step BMA method of sub-sampling.

The motion detector is disclosed in the master's thesis entitled "Embodiment of a real time motion detector by using a DSP element" submitted to Korea Institute of Science and Technology by Ki-hwan KIM in 1990.

However, the above conventional method is unreasonable when an operation mode of the DSP is considered. Because each value is squared and accumulated once after storing a difference between corresponding pixels of the current and preceding frames, an operation feature of the DSP element that performs an addition and accumulation after performing multiplication, can not be fully utilized and furthermore, it is not effective in view of the operation speed.

SUMMARY OF THE INVENTION

The object of this invention is therefore to provide a motion vector detection method for increasing the processing speed of a three-step BMA (block matching algorithm).

According to an aspect of the present invention, a method for detecting a motion vector in an image processing system having an operation device for performing summation and accumulation after multiplication, wherein luminance component data of a current macro block is received and an initial address of a search area is generated so as to detect the motion vector, includes the steps of: squaring a brightness value of each pixel of the current macro block and summing up the squared results to produce a first summation value; receiving search area data of a preceding frame corresponding to said initial address; establishing a given number of search positions at regular intervals between the pixels in a search area of the preceding frame; establishing the blocks of the same size as that of the current macro block on respective search positions so as to establish independent operation sections on areas including all the blocks, and squaring and summing up the brightness values of the pixels corresponding to the search positions with respect to each the independent operation sections, thereby to obtain independent operation values; summing up the independent values which corresponds to the respective blocks of each search position; multiplying the current macro block by a brightness value of respective pixels corresponding to respective blocks on each search position, summing up the multiplied result to produce a third summation value and doubling the summed result; adding the first summation value to said second summation value for each search position and subtracting therefrom the doubled result so as to select therefrom a minimum value; and determining a search position of block having the minimum value as a motion vector in case of completing a three-step search and returning, or otherwise, looping to the fourth step after establishing a given number of search positions at an interval between the pixels narrower than that of a prior step on the search position of block having the minimum value.

The present invention will now be described more specifically with reference to the drawings attached only by way of example.

BRIEF DESCRIPTION OF DRAWINGS

FIG. 6 is a diagram of independent operation in a first step;

FIG. 7 is a diagram of independent operation in a second step;

DETAILED DESCRIPTION OF CERTAIN PREFERRED EMBODIMENTS

Assuming that $I(m,n,t)$ is $a_k$ and $I(m+i, n+j, t-\tau)$ is $b_{kl}$ in Equation (1) for computing a MSE distortion measure, Equation (1) can be rewritten as;

$$MSE(i,j) = \frac{1}{M \cdot N} \sum_{K=1}^{M \cdot N} (a_k - b_{kl})^2 \qquad (6)$$

where, l stands for a search position index of 1, ...., 25. The summation $\Sigma$ is performed one-dimensionally for all the pixels of k blocks (where, $k=1, ..., M \times N$).

Because an operation feature of the DSP element is to perform summation and accumulation after multiplication as described in the above, Equation (6) should be arranged to the following Equation (7) for utilizing the operation feature of the DSP reasonably.

$$MSE(i,j) = \frac{1}{M \cdot N} [\Sigma(a_k)^2 + \Sigma(b_{kl})^2 - 2\Sigma a_k \cdot b_{kl}] \qquad (7)$$

An instruction MAC in the DSP element performs a multiplication and an addition in one cycle, simultaneously. Accordingly, the instruction cycle for computing a MSE by use of the instruction MAC may be expressed as follows;

first term $\sum_{K=1}^{M \cdot N} (a_k)^2 : M \times N \times 1 = M \cdot N$ cycles second term $\sum_{K=1}^{M \cdot N} (b_{kl})^2 : M \times N \times 25 \times 1 = 25M \cdot N$ cycles third term $\sum_{K=1}^{M \cdot N} a_k \cdot b_{kl} : M \times N \times 25 = 25M \cdot N$ cycles where, $M \times N$ is the number of pixels in a corresponding block and the numeral 25 is the quantity of the search positions. By computing each term separately, it takes $51 \times M \times N$ cycles totally for computing the MSE, and it is about 51% of $100 \times M \times N$ cycles computed in Equation (2) described above. Accordingly, 49% of the processing time can be reduced.

Figure 1:
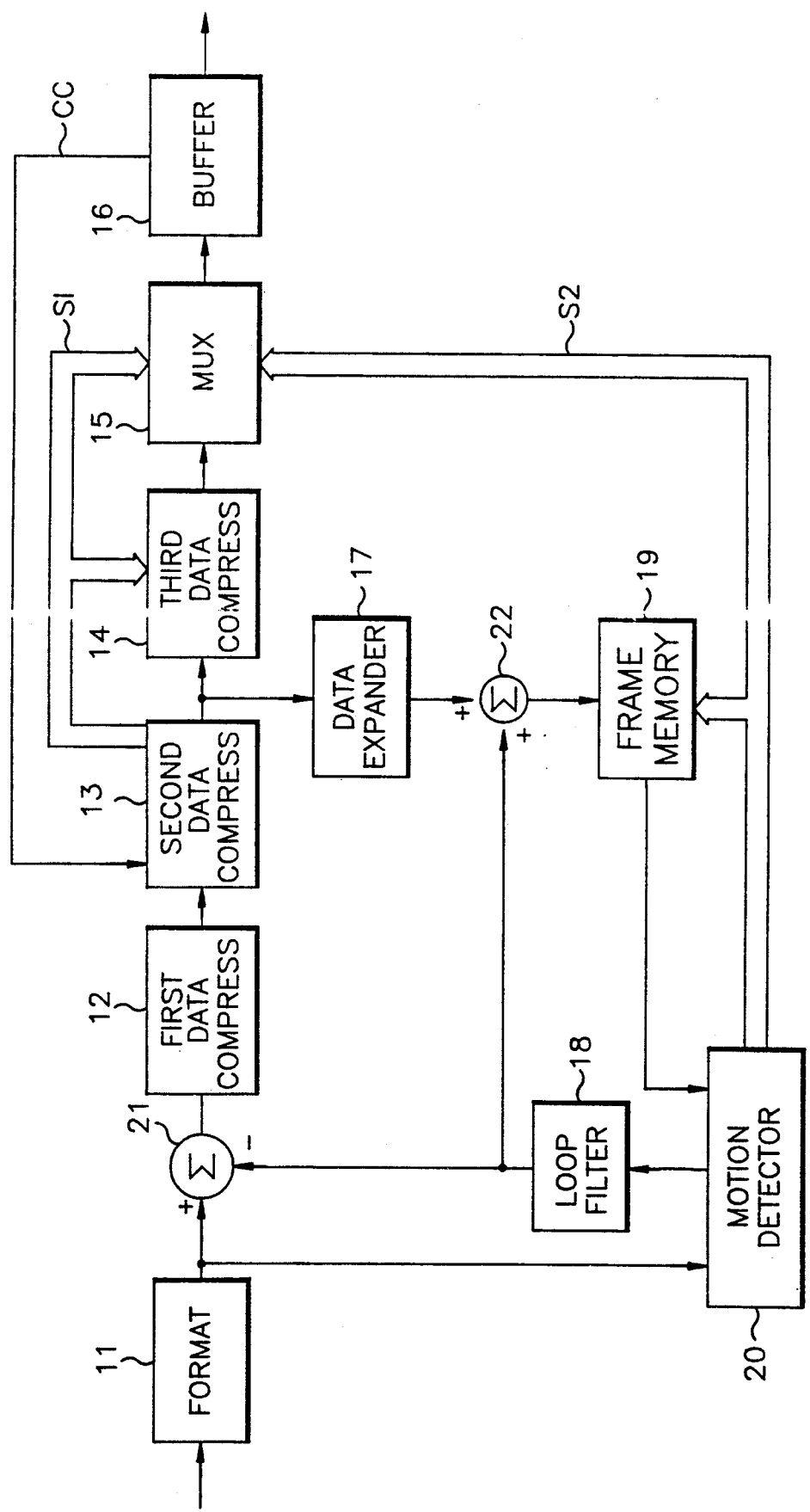
FIG. 1 is a view of video codec to which the present invention may be applied.
Figure 2:
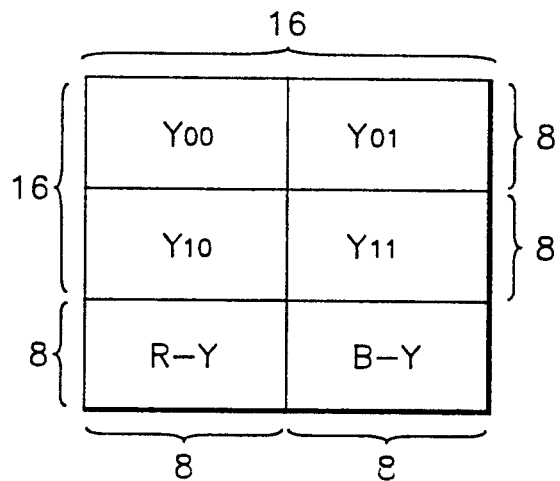
FIG. 2 is a structural diagram of a macro block.
Figure 3:
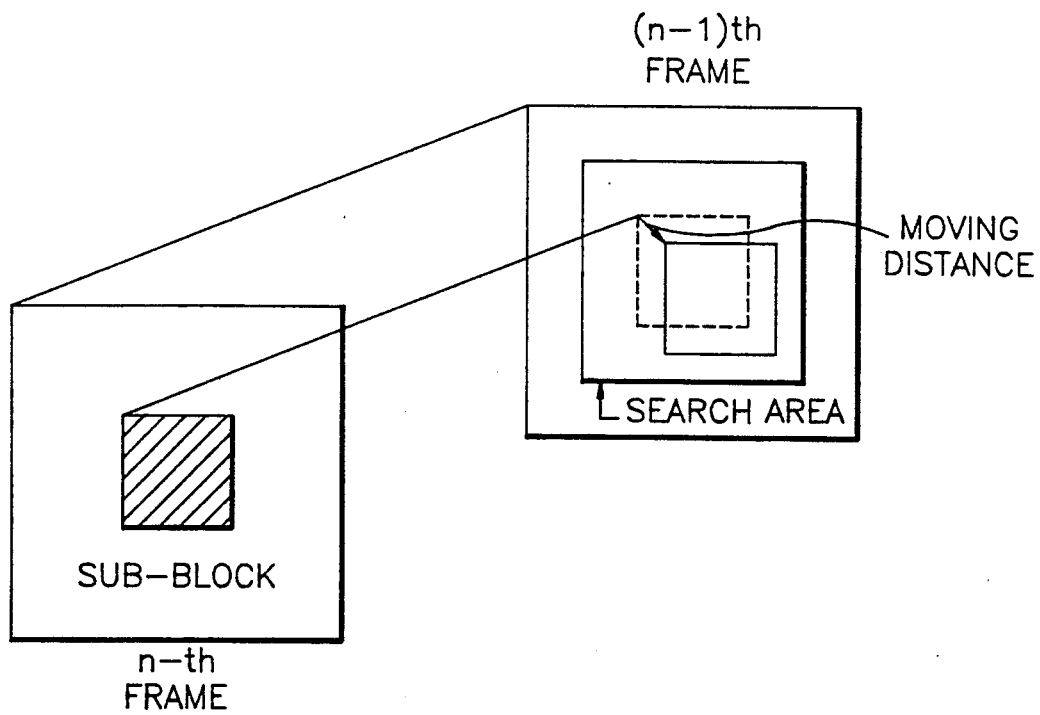
FIG. 3 is a view of detecting a motion vector by a block matching algorithm method.
Figure 4:
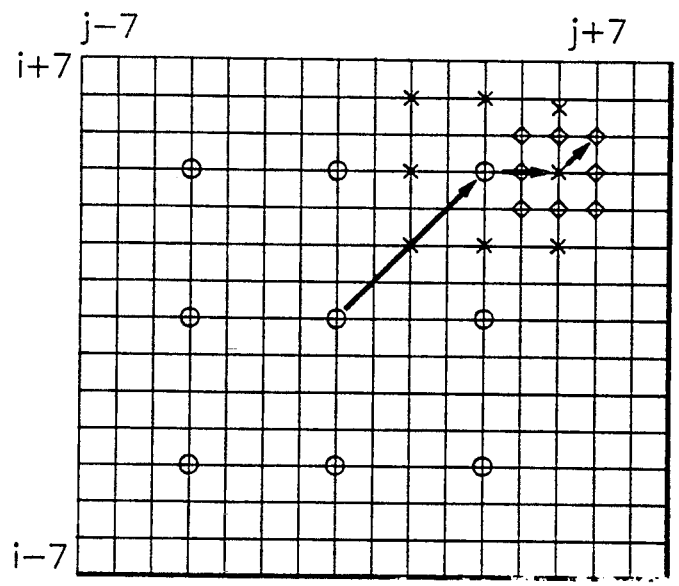
FIG. 4 is an exemplary view of three-step search method.
Figure 5:
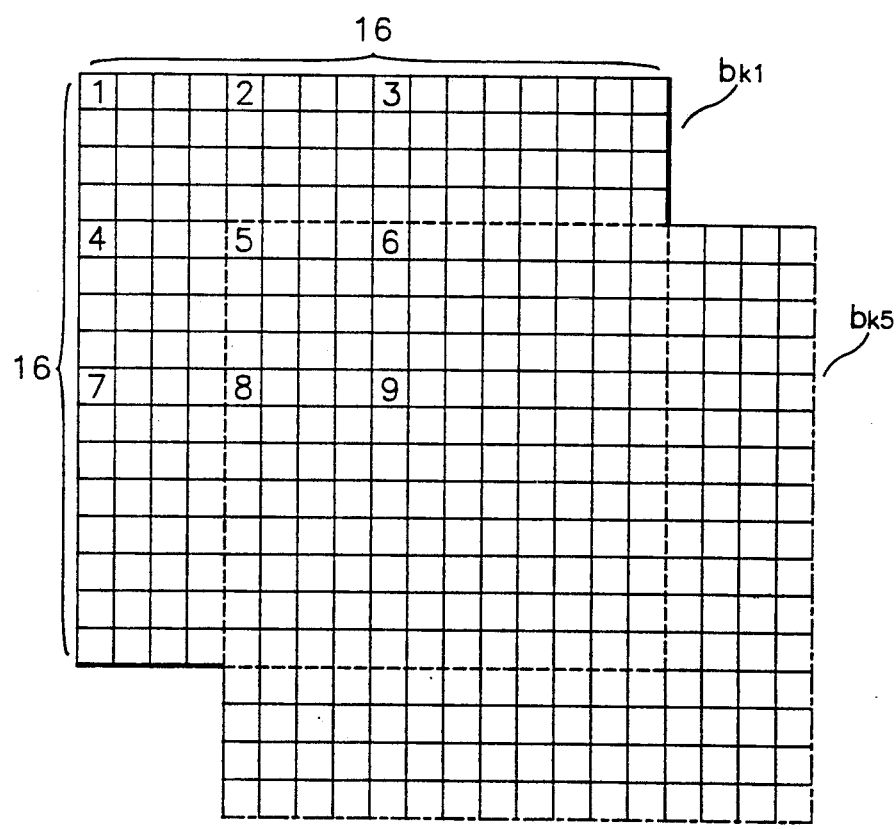
FIG. 5 is an exemplary view of a portion overlapped during computing $\Sigma(b_{ij})^2$, according to the present invention.

It is noted that since an operation of the third term is independent, the third term can not be further reduced. However, in an operation of the second term, a processing time can be reduced by treating a redundant operation portion (i.e., an overlapped portion during the operation) effectively, because there always occurs redundant operation portions at each search position. For example, the redundant operation portion of the search positions 1 and 5 in FIG. 5 is an area enclosed with a dotted line.

When the search position is 1 (i.e., 1=1), a block of preceding image frame corresponding to a current block is a portion $b_{k5}$ and a block of preceding frame corresponding to a current block at a search position 5 is the block enclosed with the dotted line. Even though it is required to compute equations $\Sigma(b_{k1})^2$ and $\Sigma(b_{k5})^2$, once the overlapped portion is computed out, the operation time thereafter can be reduced because it is only necessary that the only non-overlapped portion be added to the result of computing overlapped portion Since the CCITT regulation H.261 recommends a $16 \times 16$ block size for a motion detection of luminance component in a video phone, in the embodiment, the block sizes M and N are set to 16 respectively for computing the MSE and the processing time is computed under the condition of $16 \times 16$ block size.

In the first search step in which the pixel intervals are $\pm 4$ in the block, the entire search area is divided into 25 portions to be operated independently, as shown in FIG. 6.

In a block corresponding to each search position, the computed value of $\Sigma(b_{kl})^2$ (where $l=1, 2, ..., 25$) of the second term is obtained by summing up $$\sum_{sec} (b_k)^2$$

of operation values of the respective nine independent portions (where, the "sec" represents each search section.)

Consequently, the total time required for operating the second term in the first step is expressed as a summation of the instruction SQRA for adding and squaring a relative image element of each portion, and the number of summation cycles required for adding the portion values of the nine portions corresponding to blocks in each search position to the number of cycles required for performing the SAC instruction for storing the added value. Further, the total time is expressed as;

$$T\left(\sum_{sec} (b_k)^2\right) = PL + S \text{ (cycles)} \qquad (8)$$

where, the PL indicates the number of cycles required for squaring and accumulation operation, and the S indicates the number of cycles required for the store operation. Therefore, a total 601 cycles are required in FIG. 6.

The number of corner portions are 16, (i.e., S1, S2, S4, S5, S6, S7, S9, S10, S16, S17, S19, S20, S21, S22, S24, S25), the number of edge portions is 8 (i.e., S3, S8, S11, S12, S14, S15, S18, S23) and the number of pixels, to which one is added, of a center portion S13 is 65. Therefore, the result of computing cycles is expressed as $17 \times 16 + 33 \times 8 + 65 \times 1 = 601$ cycles.

In addition, the 10 cycles are required for adding 9 portions of blocks corresponding to each search position. For example, an operation of the second term for the search position 1 is performed by summing up the nine portions of S1, S2, S3, S6, S7, S8, S11, S12, S13 in FIG. 6 and an operation of the second term for the search position 5 is performed by summing up the nine portions of S7, S8, S9, S12, S13, S14, S17, S18, and S19.

Because the number of the search positions is 9 in the first step and 10 cycles are required for summing up the values of 9 portions per one search position, the total cycles for summing up all resultant value of all search positions becomes 90. Accordingly, the total operation time of the second term in the first step becomes 691 cycles.

In the second step, an entire search area is divided into a number of 25 portions to be operated independently as shown in FIG. 7, and the total operation time is computed in the same way as the first step as follows.

$$5 \times 16 + 25 \times 8 + 144 \times 1 = 424 cycles:$$

$$10 \times 8 = 80 cycles$$

Accordingly, the total operation time is expressed as 504 cycles by summing up 424 cycles and 80 cycles.

Figure 8:
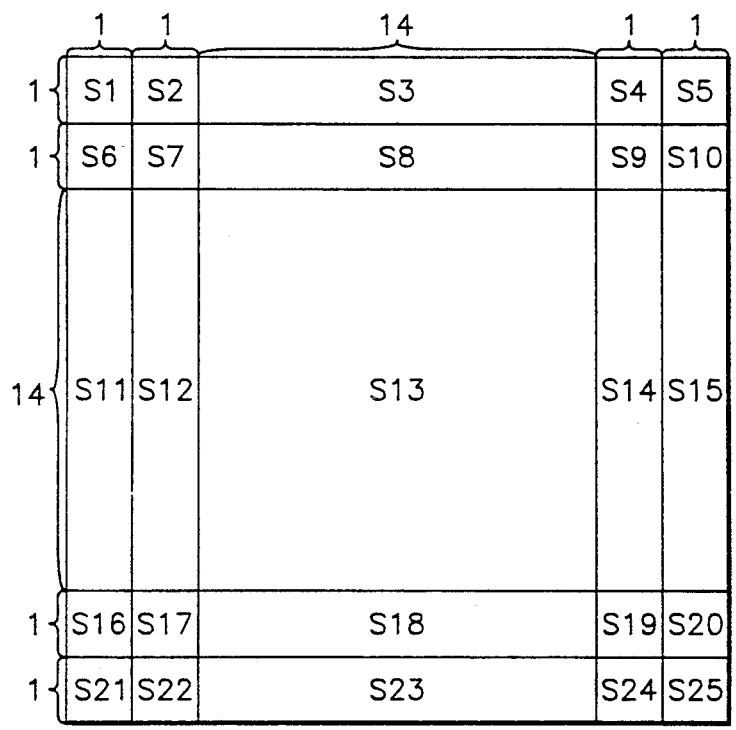
FIG. 8 is a diagram of independent operation in a third step.
Figure 9:
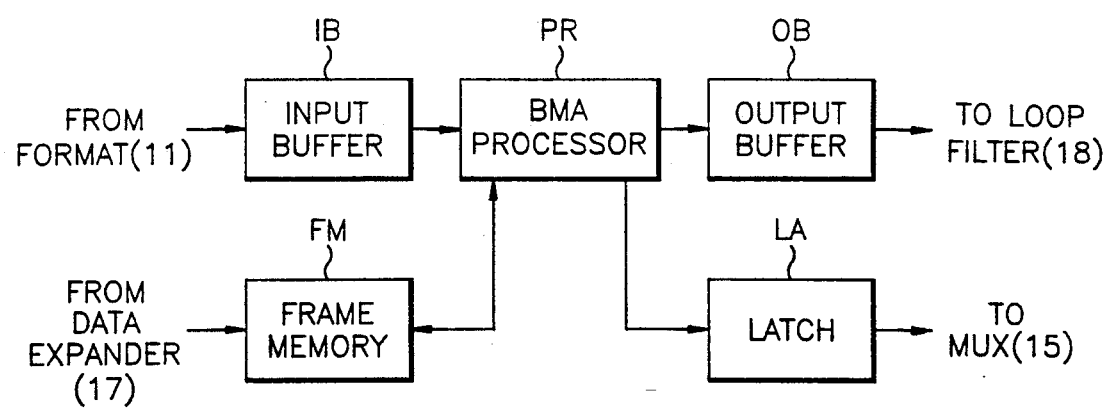
FIG. 9 is a schematic block diagram of a motion detector according to the present invention.

In the third step, a search area is divided into 25 portions to be operated independently as shown in FIG. 8, and the total operation time is computed in the same way as follows.

$$1 \times 16 + 14 \times 8 + 196 \times 1 = 324 cycles$$

$$10 \times 8 = 80 cycles$$

The total operation time is expressed as 404 cycles by summing up 324 cycles and 80 cycles.

Finally, it takes 1599 cycles to perform an operation of the second term $\Sigma(b_{kl})^2$ (where, $l=1, 2, ..., 25$) because the first step takes 691 cycles and the second and third steps take 504 cycles and 404 cycles respectively.

As described above, the computing time of the MSE for a $16 \times 16$ standard block is obtained by the following equation.

$$\text{first term } \sum_{K=1}^{16 \times 16} (a_k)^2 = 25 \text{ cycles}$$

$$\text{second term } \sum_{K=1}^{16 \times 16} (b_{kl})^2 = 1599 \text{ cycles}$$

$$\text{third term } \sum_{K=1}^{16 \times 16} a_k \cdot b_{kl} = 6400 \text{ cycles}$$

where, $l=1, 2, ..., 25$. The total cycles of the above results is 32.2% of the 25600 cycles computed by Equation (2), i.e., $100 \times M \times N = 100 \times 16 \times 16$.

Accordingly, the MSE computation according to the present invention can reduces an operation time by 66.8% as compared with the conventional computing method.

When the time required for performing the three step search BMA is less than the time allocated to the BMA processor as described above, the real time motion detector 20 can be embodied by one DSP chip (BMA processor).

Figure 10:
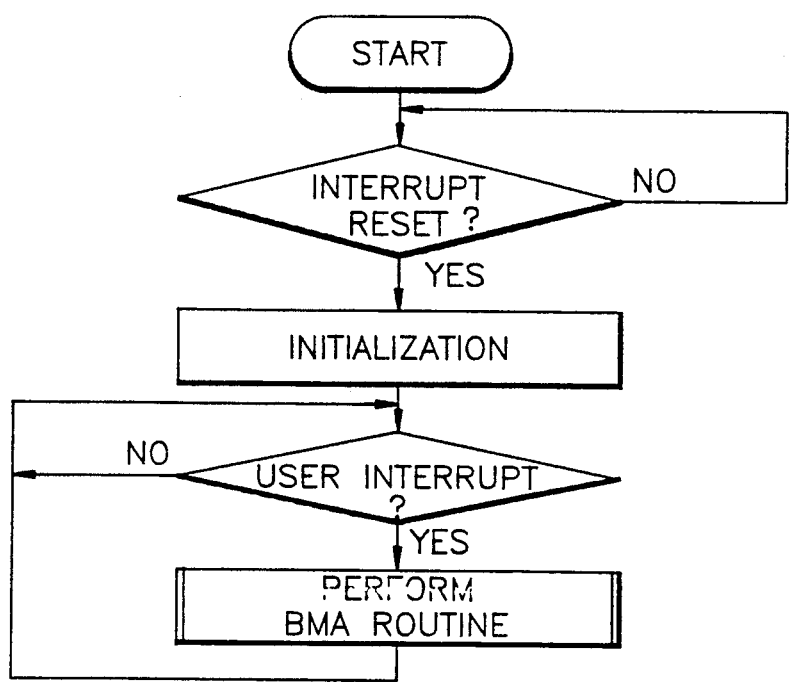
FIG. 10 is a flow chart for showing operation of motion the detection according to the present invention.

With reference to FIG. 10, an operation of the motion detector 20 using one DSP chip is illustrated. An on-chip data memory of the BMA processor and an external memory are initialized to a starting value by an interruption of a power-up reset and some constant values required for performing the BMA is produced and stored.

After performing the initialization routine, the motion detector 20 performs the BMA routine by a user's interruption and stays in an idle state. Whenever a next user's interruption is received again, the motion detector 20 repeats the BMA routine likewise.

Figure 11:
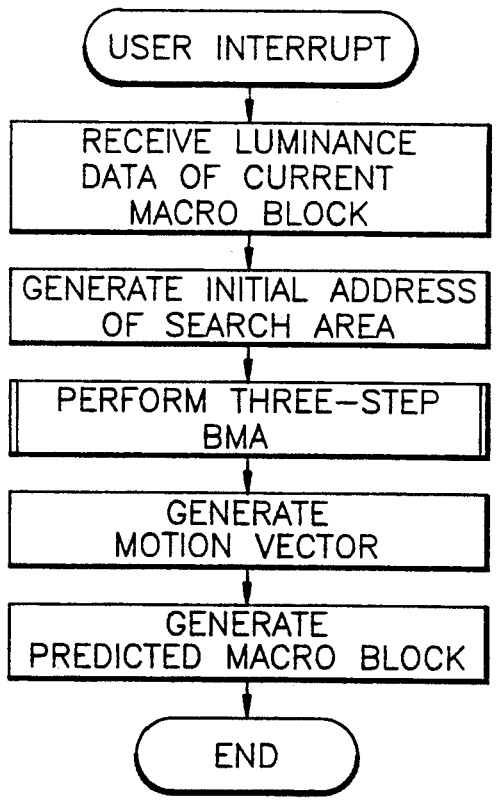
FIG. 11 is a flow chart for showing a subroutine operation of a block matching algorithm according to the present invention.

With reference to FIG. 11, the BMA routine is illustrated in detail. When the user's interrupt is generated, a luminance component of a macro block stored in an input buffer IB is connected to an input end of the BMA processor PR and the format division 11 is received as a block unit and stored in an internal memory.

After computing an initial address of search block area of preceding image frame to be brought, a motion vector is found by the first, second and third steps in order and transmitted through a latch LA connected to an end of the BMA processor PR to the multiplexer 15. A predicted block is detected from the preceding frame memory by the motion vector and moved to an output buffer OB connected to other end of the BMA processor PR. After filtering the block in the loop filter 18, a difference between the block and a block of current frame is detected in the subtractor 21. When completing the above operation in order, the motion detector 20 stays in an idle state until a next user's interrupt is generated.

Figure 12:
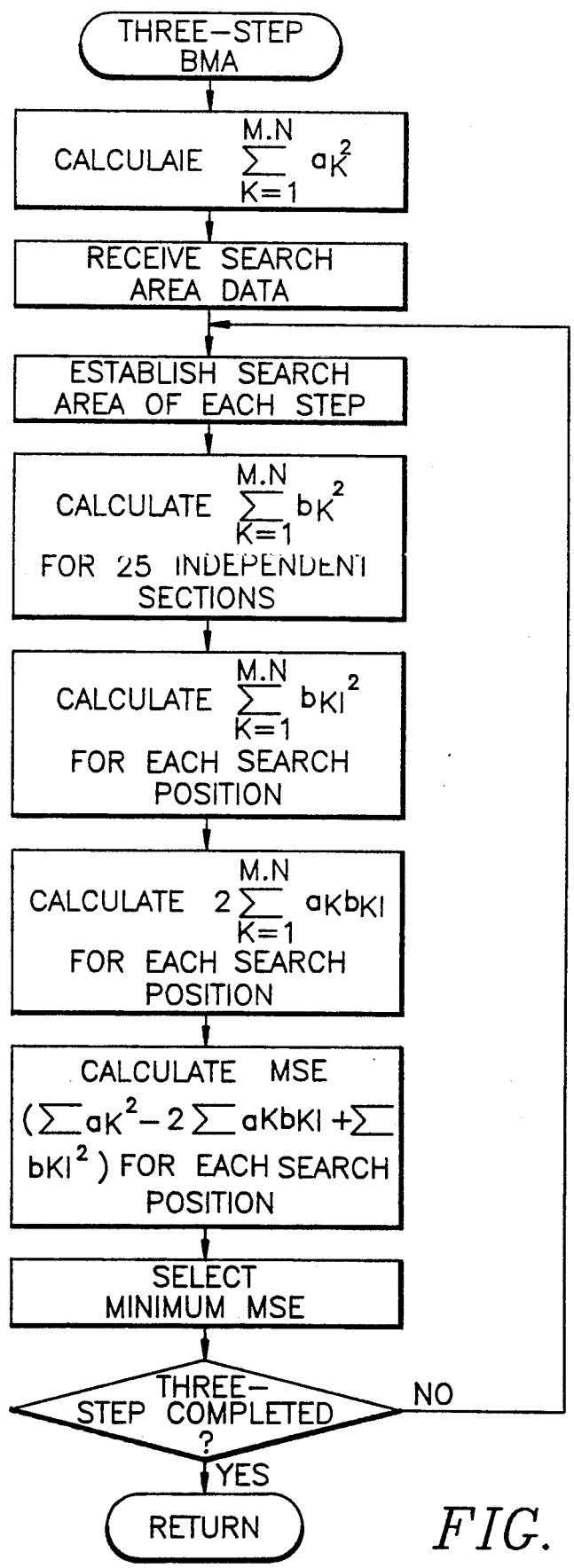
FIG. 12 is a flow chart for showing operation of a threestep block matching algorithm according to the invention.

With reference to FIG. 12, each step of performing the BMA is described as follows. First, an initial address of the search area to be brought from a previous frame memory is determined for performing the first step after storing a result by computing the first term $$\sum_{K=1}^{M \cdot N} (a_k)^2$$

of the MSE equation. In other words, the initial address of the search area includes search blocks corresponding to the number of 9 menu vectors being apart from a current macro block by ±4 pixels. Search area data is received from the initial address and stored in the internal memory.

Next, the value $$\sum_{K=1}^{M \cdot N} (b_k)^2$$

is computed and stored with respect to each of twenty five portions as shown in FIG. 6. Then, the value $$\sum_{K=1}^{M \cdot N} (b_{kl})^2$$

is computed at each search position and stored (where, $l=1, 2, ..., 25$).

After obtaining the value $$2 \sum_{K=1}^{M \cdot N} a_k \cdot b_k$$

at each search position, the value $$MSE \left( \sum_{K=1}^{M \cdot N} (a_k)^2 - 2\Sigma a_k \cdot b_{kl} + \sum_{K=1}^{M \cdot N} (b_{kl})^2 \right)$$

is computed for the nine search positions each. After performing the above described steps, the minimum MSE value of the nine MSE values is obtained as a MSE value.

The second and third steps of obtaining the MSE are performed in the same way as the first step. But a shape of portion different from the first step is formed as shown in FIGS. 11 and 12 for computing $\Sigma(b_{kl})^2$ because the menu vector has the interval of ±2 and ±1 pixels respectively in the second and third steps.

Furthermore, since the minimum MSE value is used as a menu vector for the next step, the number of new menu vector to be formed is eight and so a computation of the MSE is performed eight times.

In conclusion, it is possible to reduce an operation time by making most use of a feature of DSP chip in performing a motion detection with the three step detection method. Therefore, a real time motion detector can be embodied by a single DSP chip; further, it is economical to reduce a quantity of hardware for maintaining the same efficiency.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method for detecting a motion vector in an image processing system having an operation means for performing summation and accumulation after multiplication, wherein luminance component data of a current macro block is received and an initial address of a search area is generated so as to detect the motion vector, comprising the steps of:
   squaring a brightness value of each pixel of said current macro block and summing up the squared results to produce a first summation value;
   receiving search area data of a preceding frame corresponding to said initial address;
   establishing a given number of search positions at regular intervals between the pixels in a search area of said preceding frame;
   establishing blocks of the same size as that of said current macro block on the search positions so as to square a brightness value of pixels in the established block and to sum up the squared results to produce a second summation value;
   multiplying the current macro block by a brightness value of respective pixels corresponding to respective blocks on each search position, summing up the multiplied result to produce a third summation value and doubling the summed result;
   adding said first summation value to said second summation value for each search position and subtracting therefrom the doubled result so as to select therefrom a minimum value; and
   determining a search position of block having the minimum value as a motion vector in case of completing a three-step search and returning, or otherwise, looping to said fourth step after establishing a given number of search positions at an interval between the pixels narrower than that of a prior step on the search position of block having said minimum value.

2. The method as claimed in claim 1, wherein said block establishing step comprising the steps of:
   establishing the blocks of the same size as that of said current macro block on respective search positions so as to establish operation sections on areas including all the blocks and squaring and summing up the brightness values of the pixels corresponding to the search positions with respect to said independent operation sections, thereby to obtain independent operation values; and
   summing up said independent values which correspond to the respective blocks of each search position.

3. A method for detecting a motion vector in an image processing system having an operation means for performing summation and accumulation after multiplication, wherein luminance component data of a current macro block is received and an initial address of a search area is generated so as to detect the motion vector, comprising the steps of:
   squaring a brightness value of each pixel of said current macro block and summing up the squared results to produce a first summation value;
   receiving search area data of a preceding frame corresponding to said initial address;
   establishing a given number of search positions at regular intervals between the pixels in a search area of said preceding frame;
   establishing the blocks of the same size as that of said current macro block on respective search positions so as to establish independent operation sections on areas including all the blocks, and squaring and summing up the brightness values of the pixels corresponding to the search positions with respect to each independent operation section, thereby to obtain independent operation values;
   summing up said independent values which correspond to the respective blocks of each search position;
   multiplying the current macro block by a brightness value of respective pixels corresponding to respective blocks on each search position, summing up the multiplied result to produce a third summation value and doubling the summed result;
   adding said summation value to said second summation value for each search position and subtracting therefrom the doubled result so as to select therefrom a minimum value; and
   determining a search position of block having the minimum value as a motion vector in case of completing a three-step search and returning or otherwise, looping to said fourth step after establishing a given number of search positions at an interval between the pixels narrower than that of a prior step on the search position of block having said minimum value.

* * * * *

UNITED STATES PATENT AND TRADEMARK OFFICE
CERTIFICATE OF CORRECTION

PATENT NO. : 5,173,772
DATED : 22 December 1992
INVENTOR(S) : Keon-Young Choi

It is certified that error appears in the above-indentified patent and that said Letters Patent is hereby corrected as shown below:

Column 1    Line 18,    "delete" "a" (the first occurrence), after "of", delete " ; " and insert -- a --;

Line 22,    after "because", delete "occurs", after "change", delete " ; " and insert --occurs--;

Column 3    Line 3,    after "as", change "o" to --0--;

Column 4    Line 38,    preceding "second", change "said" to --the--:

Column 10, line 5, preceding "operation", insert --independent--.

Signed and Sealed this

Twenty-second Day of August, 1995

Attest:

BRUCE LEHMAN

*Attesting Officer*    *Commissioner of Patents and Trademarks*